June 8, 1926.
C. B. BAILEY
GASKET
Filed May 20, 1925
1,587,626
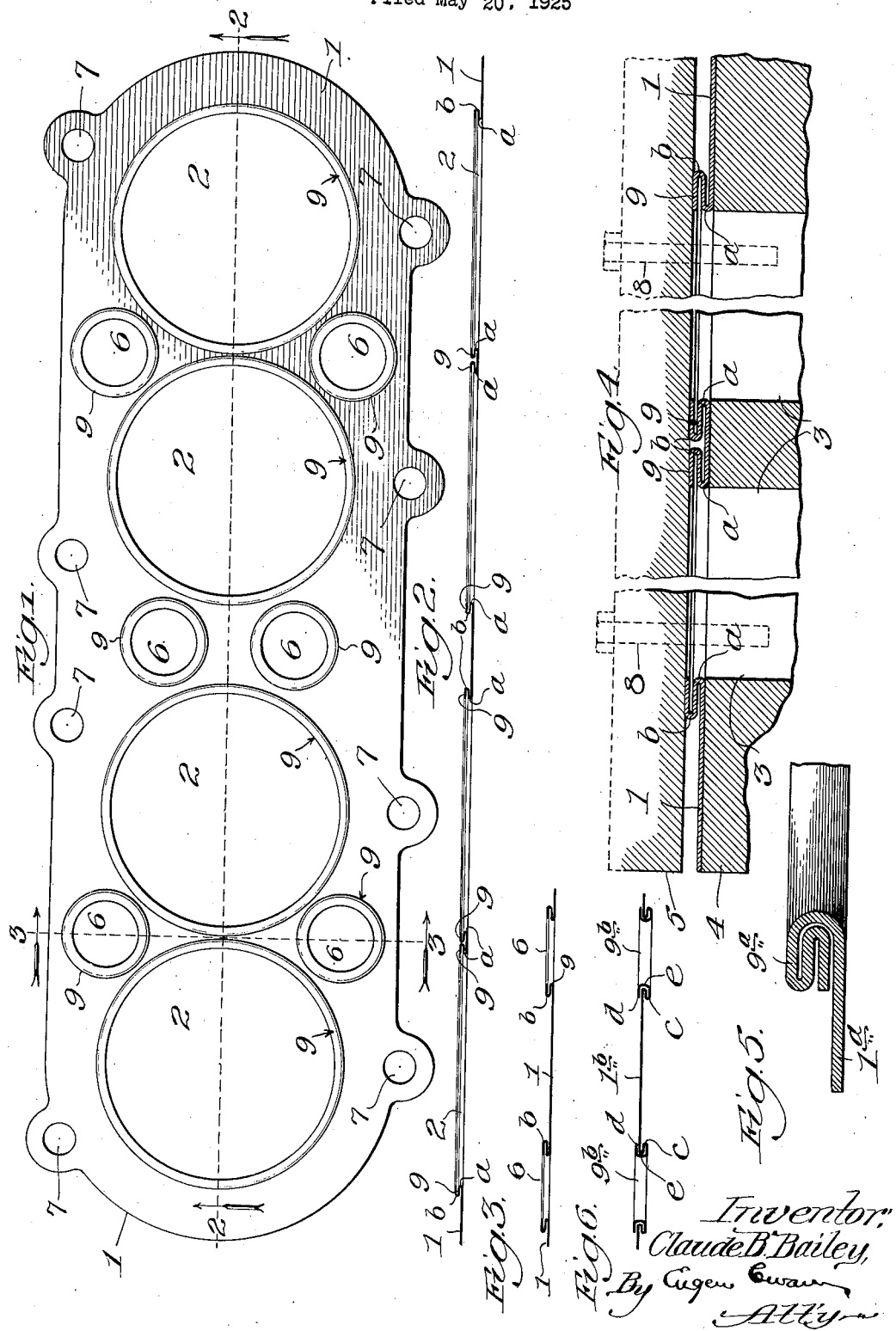
Inventor:
Claude B. Bailey,
By Eugene Ewan
Att'y Patented June 8, 1926.

1,587,626

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed May 20, 1925. Serial No. 31,483.

My invention contemplates a gasket having its pressure receiving portion composed of a plurality of superimposed layers formed from a single piece of sheet metal to take the place of the asbestos cushion heretofore generally employed in conjunction with sheet metal gaskets, thereby enabling the gasket to be made entirely of sheet metal to simplify the structure and reduce the cost of manufacture thereof.

The pressure receiving portion so formed immediately surrounds the port hole or opening in the gasket body and, being thicker than the same, allows all of the available pressure exerted on the gasket through the members between which the gasket is clamped to be concentrated on and confined to this portion, thus obtaining a tight joint at the opening instead of wasting the pressure by distributing the same over the entire area of the gasket body, as has been the general practice heretofore, thereby enabling a tight joint to be made with less pressure.

A further object of my invention is to make this pressure receiving portion integral with the sheet metal body of the gasket so that said portion may be bent into folded form directly from the metal of the body at the gasket opening, thereby making the gasket cheaper to manufacture and producing a more substantial structure.

The invention further contemplates the provision of these pressure receiving portions about the port holes or openings in cylinder head gaskets, manifold gaskets, and others having a plurality of spaced holes or openings therein, so that these gaskets may be made entirely of sheet metal and from single sheets or layers thereof to reduce the cost of manufacture and produce efficient gaskets.

In providing these pressure receiving portions in folded form, the thickness of the same in different gaskets may be increased or decreased by varying the number of folds or layers to provide sufficient metal to suit the conditions of the finish of the surfaces between which the gaskets are clamped, thus enabling tight joints to be made by providing sufficient cushion of metal to flow into the interstices in said surfaces.

The invention consists further in the matters hereinafter described and claimed.

In the accompanying drawings—

Fig. 1 is a plan view of a cylinder head gasket constructed in accordance with my invention;

Figs. 2 and 3 are sectional views taken through the gasket on lines 2—2 and 3—3, respectively, of Fig. 1;

Fig. 4 is an enlarged vertical sectional view showing the manner in which the gasket is clamped in place when in use; and Figs. 5 and 6 are vertical sections showing modified forms of the structure.

As shown in the drawings, the gasket has a flat body 1 stamped or otherwise formed from a single layer of sheet metal, such as copper, brass, aluminum, zinc, or other suitable material. Said gasket, when of the cylinder head type, has a plurality of relatively large port holes or openings 2, 2 cut or otherwise formed in its body 1 and disposed in a row lengthwise thereof with said holes substantially the same in size and arranged to fit about the cylinder openings 3, 3 in the engine block 4, against which the gasket is clamped through the cylinder head 5, as shown in Fig. 4. As shown in Fig. 1, the body 1 is further provided with a plurality of smaller port holes 6, 6 also of the same size and arranged to fit about the registering water passages in the engine block 4 and head 5, respectively.

The gasket shown in the drawings is designed for use with a four cylinder internal combustion engine with overhead valves, such as employed in Chevrolet cars, although of course the gasket may be designed for six and more cylinder motors and with other valve arrangements without departure from the spirit and scope of my invention.

The gasket body 1 is also provided with other holes 7, 7 to receive the clamping bolts or studs 8, 8 employed for clamping the gasket between the cylinder head and engine block, as shown in Fig. 4, said holes 7, 7 in the gasket shown being arranged along the opposite side margins of the gasket body to conform with the stud arrangement for the particular installation for which the gasket is designed.

Around each of the port holes 2, 6, I provide a pressure receiving portion 9. These portions 9 are carried by the single metal layer of the gasket body 1 at the holes or openings 2, 6, and completely surround the same, as shown in Fig. 1. As illustrated in Figs. 2 and 3, the portions 9, 9 are arranged on the same side of the body 1 and project outward beyond the plane thereof, as shown. It is not essential to have the portions 9, 9 so arranged, as they may be on opposite sides of the body 1 and extend through the associated openings, as shown in Fig. 6. These portions 9, 9 are relatively narrow in width as compared to the width of the gasket body 1 and, being thicker than the body, allow all of the available pressure exerted on the gasket through the members between which the gasket is clamped to be concentrated on and confined to said portions to obtain tight joints at the openings without wasting the clamping pressure by distributing it over the entire area of the gasket body.

This is an important factor of my invention because it enables tight joints to be had immediately at the port openings with less pressure than required for gaskets having the pressure distributed over the entire surface thereof. This allows smaller studs or bolts to be used, or the same size studs as now employed may be used with less strain or tension on them to provide tight joints.

As shown in Figs. 2 to 4, the portions 9 are formed integral with the single metal layer 1, thus enabling said portions to be folded into form directly from the metal layer about the edges of the holes 2, 6. This is another important feature of my invention because it enables all parts of the gaskets to be made integral and from single layers or sheets of sheet metal, thus simplifying and cheapening the construction as well as producing more substantial ones.

Said portions 9 are in folded form so that sufficient cushion is made by the metal to fill the interstices or other irregularities in the cast or machined surfaces between which the gasket is clamped to provide tight joints. By increasing or decreasing the number of folds or layers, sufficient metal may be provided to suit the condition of the finish of these surfaces. Fairly rough surfaces, such as presented by some castings, will require a greater number of folds or layers than better finished surfaces. The metal making up the folds or layers is under slight tension and the layers are slightly spaced apart. This makes the pressure receiving portions 9 yieldable to the clamping pressure when exerted on the gasket to produce tight joints.

In Figs. 2 to 4, I have shown each portion 9 composed of two folds or layers, with the layers lying one above the other substantially parallel to each other and to the body 1, with the folded edges $a$, $b$ connecting the layers inside and outside, respectively, of the portions. This manner of folding provides three thicknesses of sheet metal in conjunction with the body 1, and is sufficient for well finished surfaces. The folded portions are in substantially S-form.

In Fig. 5, the pressure receiving portion $9^a$ is folded to one side of the body $1^a$ with the folded portion doubled or rolled over on itself in bead like form to provide in conjunction with the layer $1^a$ four thicknesses of sheet metal to take care of rougher surfaces.

In Fig. 6, the pressure receiving portions $9^b$ are folded from the layer $1^b$ at the gasket opening to provide four thicknesses of sheet metal about the opening in conjunction with the body layer $1^b$. The metal is so folded that the doubled portion $c$ is one side of the body layer, and the single portion $d$ is on the opposite side with the connecting portion $e$ extending through the gasket opening.

With my improvements, the gasket is considerably reduced in thickness as compared to the structures heretofore in general use, and, being entirely of sheet metal, provides a metal to metal joint when clamped in place, without it being necessary to pay any particular attention to the manner of tightening the gasket down between the head and block. The gaskets being entirely of sheet metal and having all parts thereof integral, blow-outs are prevented for the reason that there are no separate parts in the gasket structure to loosen and fracture under high pressures, as with gaskets made up of separate metal layers or facings and interposed layers of asbestos, the latter being particularly subject to blow-outs by concealed defects therein.

Gaskets embodying my invention may take various shapes and sizes and be capable of various uses. The details of structure shown and described herein may be variously changed and modified without departing from the spirit and scope of my invention.

I claim as my invention:

1. A gasket having an opening and a pressure receiving portion surrounding the opening and made in folded form with all portions thereof formed from a single piece of sheet metal.

2. A gasket having an opening and a pressure receiving portion surrounding the opening and composed of a plurality of superimposed layers slightly spaced apart and all folded from a single piece of sheet metal.

3. A gasket having an opening and a pressure receiving portion surrounding the opening and composed of a plurality of superimposed layers in substantially S-form and all folded from a single piece of sheet metal.

4. A gasket having an opening and a pressure receiving portion surrounding the opening and composed of a plurality of superimposed layers slightly spaced apart and disposed in substantially parallel relation to each other and to the plane of the opening and all folded from a single piece of sheet metal.

5. A gasket having an opening and a pressure receiving portion surrounding the opening and composed of a plurality of superimposed layers all folded from a single piece of sheet metal and disposed with the folded edges of the metal on the opposite sides of said portion and surrounding the same.

6. A gasket made entirely from a single piece of sheet metal and having an opening and a pressure receiving portion surrounding the opening, said pressure receiving portion being composed of a plurality of superimposed layers substantially parallel to each other and to the plane of the opening with all of the layers composing said portion being integrally connected by being folded into superimposed form from the sheet metal of the gasket.

7. A gasket made entirely of sheet metal and having a flat body of a single layer of sheet metal with an opening therein, and a relatively narrow pressure receiving portion carried by the body about said opening, said pressure receiving portion being bent into folded form from sheet metal to provide a plurality of superimposed layers out of the plane of the body and parallel thereto and to each other with all the layers integrally connected by the folds in the metal between them.

8. A gasket made entirely of sheet metal and having a flat body of a single layer of sheet metal with an opening therein, and a relatively narrow pressure receiving portion carried by the body about said opening, said pressure receiving portion being bent into folded form from the sheet metal of the body about the opening to provide a plurality of layers out of the plane of the body and parallel thereto and integrally connected with each other and the body by the folds in the metal between them.

9. A gasket having a flat body of a single layer of sheet metal with a plurality of separated port holes therein, and a plurality of relatively narrow pressure receiving portions thicker than the body and carried thereby one about each of said holes, said portions being of sheet metal and in folded form.

10. A gasket having a flat body of a single layer of sheet metal with a plurality of separated port holes therein, and a plurality of relatively narrow pressure receiving portions thicker than the body and carried thereby, one about each of said holes, said portions being bent into folded form from the metal of the body at the respective holes.

11. A gasket having a flat body of a single layer of sheet metal with a plurality of separated port holes therein, and a plurality of relatively narrow pressure receiving portions thicker than the body and carried thereby, one about each of said holes, said portions being all on the same side of the body and bent into folded form from the metal of the body at the respective holes.

12. A cylinder head gasket made entirely from sheet metal and having a flat body with a plurality of port holes therein, and a plurality of relatively narrow pressure receiving portions carried by the body about the respective port holes, said portions being bent into folded form from the sheet metal and composed of a plurality of superimposed layers out of the plane of the body and parallel to each other and to said body, all of the layers being integrally connected by the folds in the metal between them.

13. A cylinder head gasket made entirely from a single piece of sheet metal and having a flat body of a single layer of that metal, said body having a plurality of port holes therein, and a plurality of relatively narrow pressure receiving portions about said port holes and bent into folded form from the metal about the respective port holes to provide a plurality of superimposed layers out of the plane of the body and parallel to each other and to said body, all of the layers in each portion being integrally connected to each other and to the layer of the body by the folds in the metal between them.

In testimony whereof I affix my signature this 15 day of May, 1925.

CLAUDE B. BAILEY.